(12) United States Patent
Miyai

(10) Patent No.: US 8,988,720 B2
(45) Date of Patent: Mar. 24, 2015

(54) DISPLAY DEVICE, IMAGE FORMING APPARATUS AND METHOD OF CONTROLLING DISPLAY DEVICE

(71) Applicant: KYOCERA Document Solutions Inc., Osaka (JP)

(72) Inventor: Toshiya Miyai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/074,935

(22) Filed: Nov. 8, 2013

(65) Prior Publication Data

US 2014/0139872 A1 May 22, 2014

(30) Foreign Application Priority Data

Nov. 16, 2012 (JP) ................................. 2012-252432

(51) Int. Cl.
*G06F 3/12* (2006.01)
*H04N 1/00* (2006.01)
*G06K 15/02* (2006.01)

(52) U.S. Cl.
CPC ....... *H04N 1/00411* (2013.01); *H04N 1/00424* (2013.01); *H04N 1/00435* (2013.01); *H04N 1/00466* (2013.01); *H04N 1/00472* (2013.01); *H04N 1/00474* (2013.01); *H04N 1/00477* (2013.01); *H04N 1/00482* (2013.01); *H04N 1/00506* (2013.01)
USPC .......................................... 358/1.15; 358/1.2

(58) Field of Classification Search
CPC .......... H04N 1/00411; H04N 1/00424; H04N 1/00435; H04N 1/00466; H04N 1/00472; H04N 1/00474; H04N 1/00477; H04N 1/00482; H04N 1/00506
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

2006/0103666 A1* 5/2006 Kita .............................. 345/619
2008/0282155 A1* 11/2008 Kempanna .................... 715/273

FOREIGN PATENT DOCUMENTS

JP        2006-139186 A      6/2006

* cited by examiner

*Primary Examiner* — Thierry L Pham
(74) *Attorney, Agent, or Firm* — Morgan, Lewis & Bockius LLP

(57) ABSTRACT

A display device includes a display position that includes a main region and a subregion, an operation portion that receives an input for producing a message and a movement operation for moving the message in the main region to the subregion, a storage portion that stores set data on the message and degree-of-importance data and a determination portion that determines, based on the degree-of-importance data, the degree of importance of the message. The display portion displays, in the subregion, the message on which the movement operation has been performed when the degree of importance is equal to or lower than a first criterion and continuously displays, in the main region, the message on which the movement operation has been performed when the degree of importance is higher than the first criterion.

17 Claims, 11 Drawing Sheets

| WORD | DEGREE OF IMPORTANCE |
|---|---|
| URGENT | 10 |
| IMPORTANT | 10 |
| MAINTENANCE | 6 |
| REPAIR | 8 |
| ORIGINAL DOCUMENT | 2 |
| FAILURE | 9 |
| SHEET | 3 |
| PERIODIC | 4 |
| ⋮ | ⋮ |

DISPLAY DEVICE, IMAGE FORMING APPARATUS AND METHOD OF CONTROLLING DISPLAY DEVICE

This application is based upon and claims the benefit of priority from the corresponding Japanese Patent Application No. 2012-252432 filed on Nov. 16, 2012, the entire contents of which are incorporated herein by reference.

BACKGROUND

The present disclosure relates to a display device including a display portion that displays a message, an image forming apparatus including such a display device and a method of controlling the display device.

Display devices may be attached to various types of electrical and electronic devices. For example, a display device displays a screen for the input of settings of a device or for the operation of the device. Some display devices may display a message showing the state of a device, such as an error or a trouble code corresponding to an error. An example of an image processing device that will be described below and that displays a message according to the state of the device is known.

Specifically, the image processing device includes an operation panel that has a display screen, a display means that displays a main screen and a subscreen on the display screen and a setting means that can set a display form for each type of subscreen. In the image processing device, when the setting means sets whether or not the display of a message is present, the setting means determines, according to the type of the message, whether or not the setting of no display is allowed or prevented; when the message is a message in which the setting of no display is prevented, even if the display of no display is set, the display means displays the message; and the setting means determines, according to the degree of importance of the message, whether the change of the presence and absence of the message is allowed or prevented. For example, the degree of importance is set depending on the type of message, using three levels, large, medium and small.

Not only the state of a device but also an arbitrary (desired) message such as an electronic tag can be displayed on a display device, and thus a display region can be used like a bulletin board, with the result that it is possible to enhance convenience. When an electronic tag is displayed, a user performs an operation for inputting and setting a message (for example, a precaution or an item that is known to each user) and displaying the produced message. Consequently, text, a string of characters or the like that is produced and set is displayed on the display device.

Here, there is a limitation in the size of the display portion (display screen) of the display device. Hence, the number of messages that can be displayed by the display device is limited. Thus, preferably, by reducing the display region of the message or changing the display position of the message, it is possible to change the display form of the message.

However, the degree of importance (the value of information) differs from message to message. A message having a higher degree of importance is made to be more accurately recognized by the user, and it is also necessary to accurately change the display form of the message according to the degree of importance.

Conventionally, for a message that is arbitrarily input by the user (produced by the user), it is impossible to individually set the degree of importance of the message. Hence, conventionally, for the message produced by the user, its display form is not changed in consideration of the degree of importance of the message. Although it is considered that the setting of the degree of importance according to the input and production of the message is allowed, the setting of the degree of importance may be bothersome to the user (in such a case, the degree of importance is often only set normal). An appropriate degree of importance is not necessarily set for the message. An erroneous degree of importance is set, and thus the display device may be difficult to see and use.

The above known technology is a technology on the display of a message that is predetermined (determined as the specification of the device). Hence, it is impossible to apply it to a case where an arbitrary message (for example, an electronic tag) that the user, as necessary, produces, inputs, adds and registers to the device is displayed. Whether or not the message is important for the user is determined not by the type of message but by the details of the message. A preset degree of importance is not necessary appropriate. Hence, it is likely that it is impossible to accurately change the display form of the message according to the degree of importance.

SUMMARY

The present disclosure is made to solve the foregoing problem of the conventional technology. According to a first aspect of the present disclosure, there is provided a display device including: a display portion that includes, as a display region, a main region and a subregion narrower than the main region and that displays a message produced by a user; an operation portion that receives a movement operation, performed by the user, for moving the message displayed in the main region to the subregion and displaying the message; a storage portion that stores set data on the message and degree-of-importance data for determining a degree of importance of the message; and a determination portion that determines, based on the degree-of-importance data, the degree of importance of the message on which the movement operation has been performed, the display portion displaying, in the subregion, the message on which the movement operation has been performed when the degree of importance is lower than a predetermined first criterion and continuously displaying, in the main region, without the message on which the movement operation has been performed being moved to the subregion, the message when the degree of importance is higher than the first criterion.

Further features and advantages of the present disclosure will become apparent from the description of embodiments given below.

DETAILED DESCRIPTION

An embodiment will be described below with reference to FIGS. 1 to 15. A description will be given below using, an example, a multifunctional machine 100 (which corresponds to an image forming apparatus) including an operation panel 1 (which corresponds to a display device). Individual elements such as the configuration and the arrangement described in the present embodiment do not limit the scope of the disclosure, and are simply illustrative.

(Outline of the Image Forming Apparatus)

Figure 1:
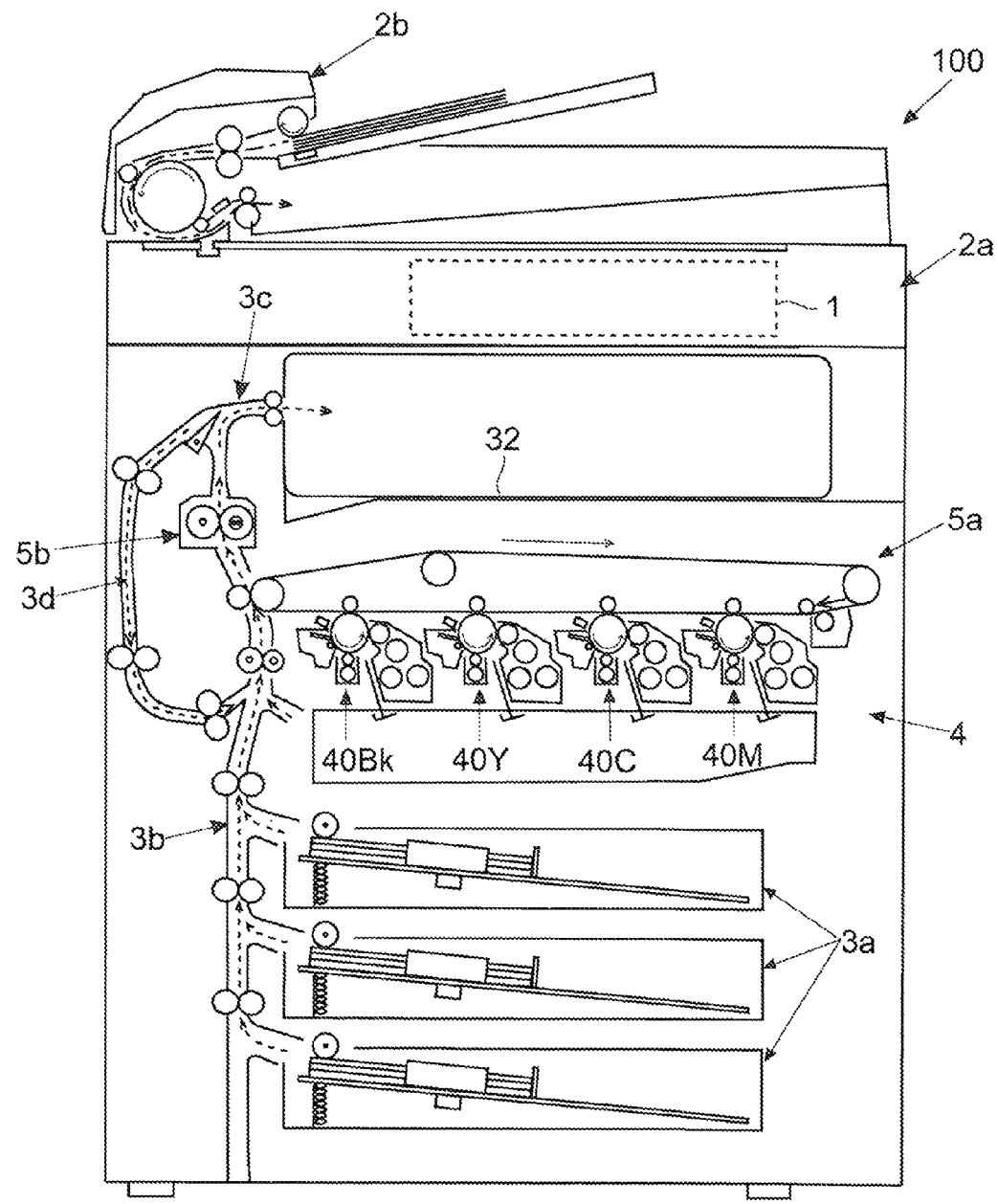
FIG. 1 is a diagram showing a multifunctional machine in an embodiment of the present disclosure.

The outline of the multifunctional machine 100 according to the embodiment will be described with reference to FIG. 1. FIG. 1 is a diagram showing the multifunctional machine 100.

As shown in FIG. 1, in the front portion of the front surface of the multifunctional machine 100, the operation panel 1 for performing various types of settings for the multifunctional machine 100 is provided (details of which will be described later). As shown in FIG. 1, in the multifunctional machine 100 of the present embodiment, an image reading portion 2a and an original document transport portion 2b are provided in its upper portion, and a paper feed portion 3a, a transport portion 3b, an image formation portion 4, an intermediate transfer portion 5a, a fixing portion 5b, an ejection transport portion 3c, a double-sided transport portion 3d and the like are included therewithin.

The image reading portion 2 reads an original document to form image data. The image reading portion 2 can also read the original document that is automatically and continuously transported by the original document transport portion 2b to a reading position.

With respect to printing, the paper feed portion 3a feeds sheets into the transport portion 3b one by one. The transport portion 3b transports the sheet to an ejection tray 32. The image formation portion 4 forms a toner image based on the image data. The intermediate transfer portion 5a is included in the image formation portion 4, receives the primary transfer of the toner image from image formation units 40 (40Bk for black, 40Y for yellow, 40C for cyan and 40M for magenta) forming toner images of the individual colors and performs the secondary transfer to the sheet. The fixing portion 5b fixes the toner image transferred to the sheet. The sheet on which the toner has been fixed (printed sheet) is ejected to the ejection tray 32. When the ejection transport portion 3c ejects the printed sheet, the ejection transport portion 3c transports the sheet in the direction of the ejection tray 32 whereas when double-sided printing is performed, the ejection transport portion 3c transports the sheet in the direction of the double-sided transport portion 3d. In this way, image formation (printing) is performed when a copying function or a printer function is used.

(Operation Panel 1)

Figure 2:
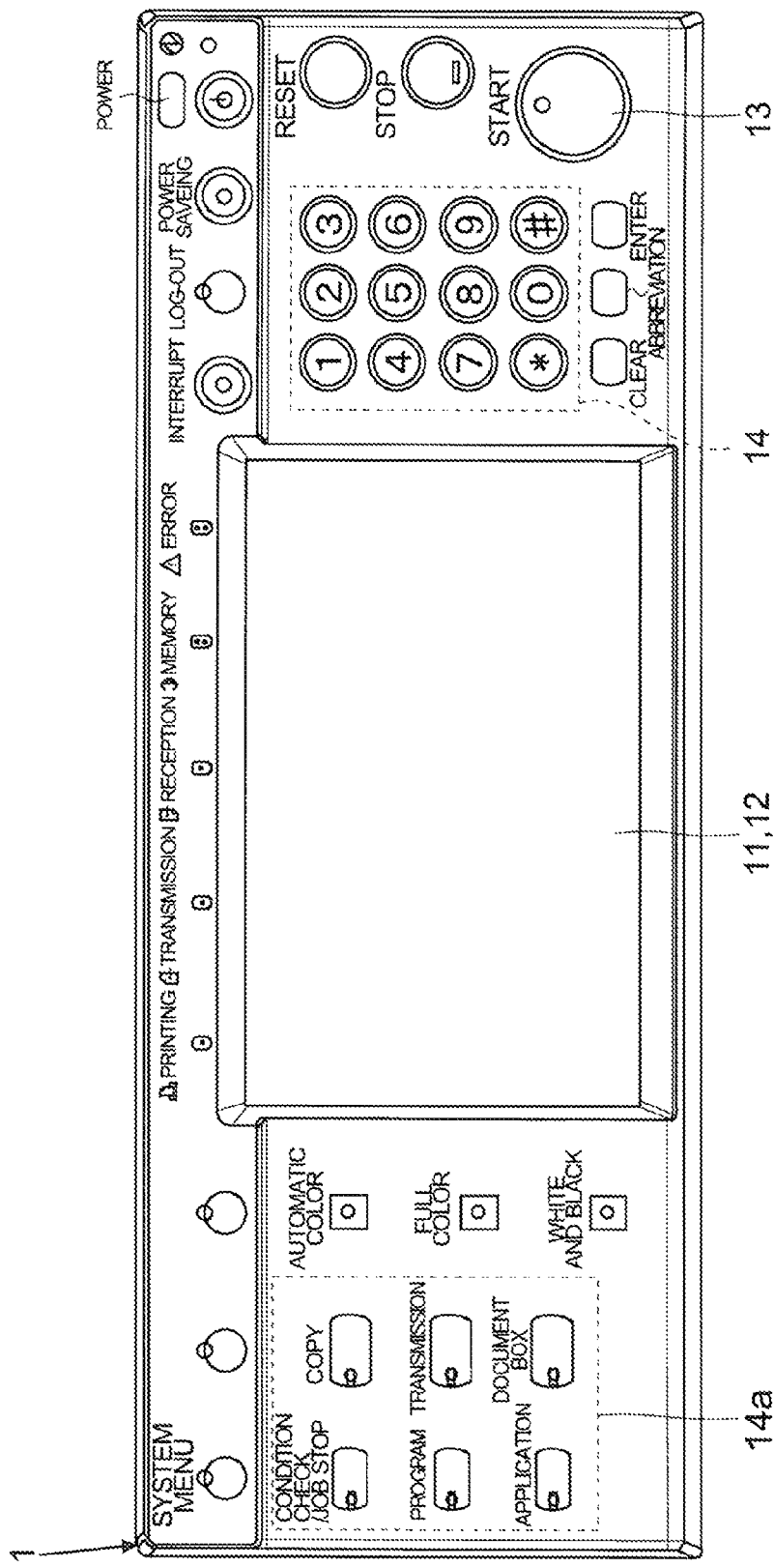
FIG. 2 is a diagram showing an operational panel in the embodiment of the present disclosure.

An example of the operation panel 1 according to the embodiment will now be described with reference to FIG. 2. FIG. 2 is a diagram showing the operation panel 1.

As shown in FIG. 1, the operation panel 1 is provided in the upper portion of the front surface of the multifunctional machine 100. The operation panel 1 includes a display portion 11, a touch panel portion 12 (which corresponds to an operation portion) and hard keys. The operation panel 1 includes, as the hard keys, a start key 13 (which corresponds to the operation portion) for processing start instruction on copying and the like and a numeric keypad portion 14 (which corresponds to the operation portion) for numerical input.

The display portion 11 is a liquid crystal display panel. The display portion 11 may be another display panel such as an organic EL panel. The display portion 11 displays a screen and an image on which a menu and keys for performing settings for the multifunctional machine 100 are arranged. A user specifies the keys displayed on the display portion 11, and thereby can input various types of settings for the multifunctional machine 100. The display portion 11 also displays various types of images and screens such as a information of the state or the like of the multifunctional machine 100 or the like.

In the upper surface of the display portion 11, the touch panel portion 12 is provided. The touch panel portion 12 detects a position and coordinates touched by the user. By comparing the display position of keys with the touched position, the key that is specified and selected by the user is identified, and thus the input by the user is received.

The display portion 11 of the present embodiment displays the message 8. This message 8 is an image onto which the message 8 produced freely by the user is added (displayed) by producing an input on the operation panel 1. The message 8 is also an image whose display position can be moved by an operation such as a drag and drop operation (the details of which will be described later).

In the operation panel 1, a function selection key group 14a is provided. The user presses any one of the keys of the function selection key group 14a to select a function to be used among the functions of the multifunctional machine 100. The function selection key group 14a includes a copy key that is pressed when a copying function is used and a transmission key that is pressed when the image data read by the image reading portion 2a is transmitted to a computer 200 or a fax device 300.

(Hardware Configuration of the Multifunctional Machine 100 and the Like)

Figure 3:
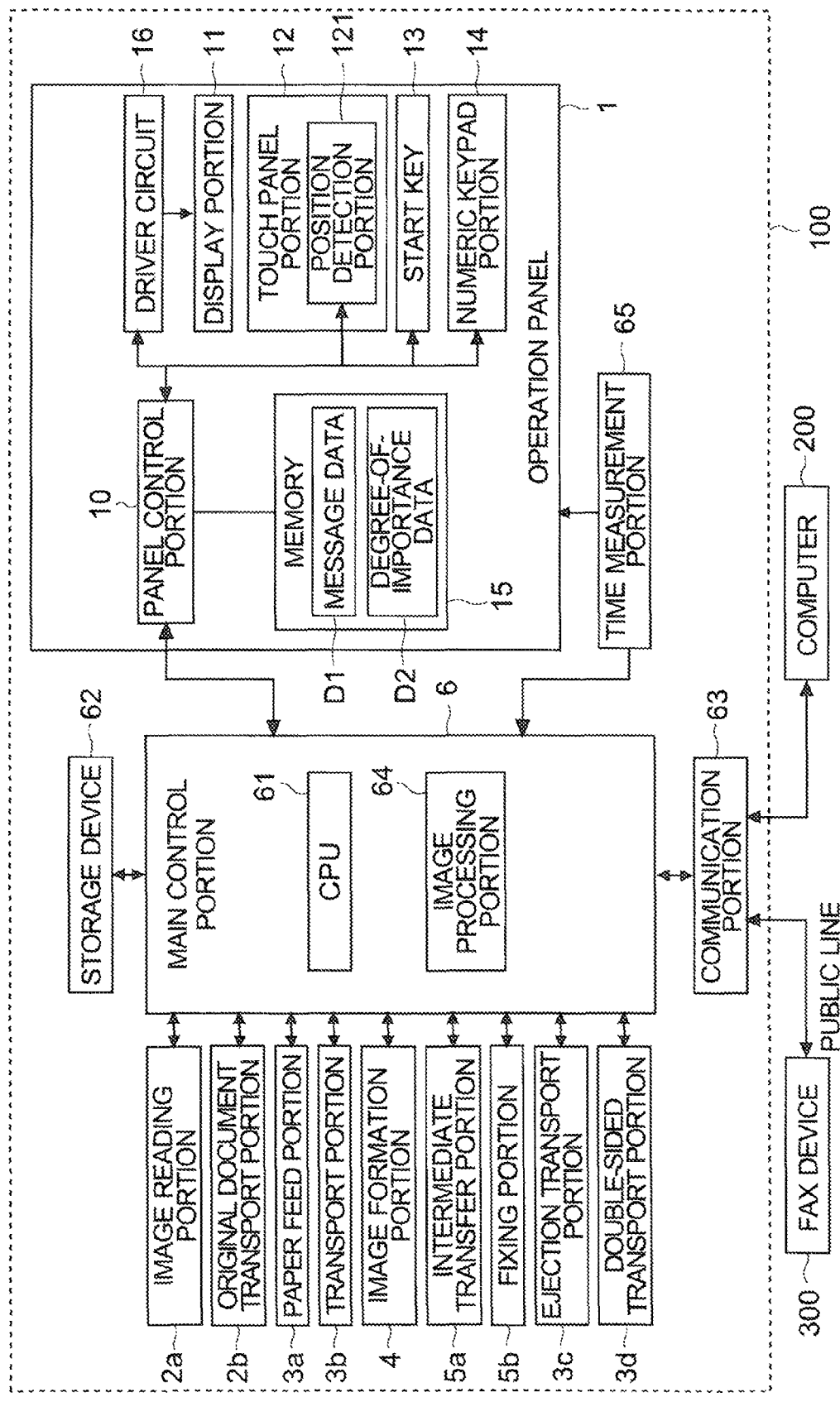
FIG. 3 is a diagram showing the hardware configuration of the multifunctional machine and the operation panel in the embodiment of the present disclosure.

An example of the hardware configuration of the multifunctional machine 100 and the operation panel 1 according to the embodiment will now be described with reference to FIG. 3. FIG. 3 is a diagram showing the hardware configuration of the multifunctional machine 100 and the operation panel 1.

A main control portion 6 is provided within the main body of the multifunctional machine 100. For example, the main control portion 6 is connected to the operation panel 1, the original document transport portion 2b, the image reading portion 2a, the paper feed portion 3a, the transport portion 3b, the image formation portion 4, the intermediate transfer portion 5a, the fixing portion 5b, the ejection transport portion 3c and the like. The main control portion 6 controls the operations thereof.

The main control portion 6 includes elements and circuits that control a CPU 61 and the like. The CPU 61 performs operations and the like based on a control program and control data stored in a storage device 62 to control the individual portions of the multifunctional machine 100. The storage device 62 (which corresponds to a storage portion) is connected to the main control portion 6. The storage device 62 is a combination of nonvolatile and volatile devices such as a ROM, a RAM and a HDD. The storage device 62 can store various types of data such as control program, control data, setting data and image data for the multifunctional machine 100.

The main control portion 6 is connected to a communication portion 63. The communication portion 63 is connected, through a network, a public line or the like, to the computer 200 or the fax device 300 (in FIG. 6, for convenience, any one of them is only shown). The main control portion 6 can perform transmission to the external computer 200 or the fax device 300 on the other party (a scanner function, a fax transmission function). The main control portion 6 can also perform printing based on image data that is transmitted from the external computer 200 or the fax device 300 on the other party and that is input to the multifunctional machine 100 (a printer function, a fax reception function).

In the main control portion 6, an image processing portion 64 is provided that performs image processing on image data on the original document and image data input through the communication portion 63 to the multifunctional machine 100. The image data processed by the image processing portion 64 is used for the printing or the transmission or is stored in the storage device 62.

The main control portion 6 recognizes an input performed on the operation panel 1, and controls the multifunctional machine 100 such that jobs such as copying and scanning are performed. The operation panel 1 of the present embodiment includes a panel control portion 10 (which corresponds to a determination portion), the display portion 11, the touch panel portion 12, the hard keys (for example, the numeric keypad portion 14 and the start key 13), a memory 15 (which corresponds to the storage portion) and a driver circuit 16.

The panel control portion 10 is formed with the CPU, an IC and the like. The panel control portion 10 controls the display of the display portion 11. The panel control portion 10 provides an instruction of details to be displayed to the driver circuit 16 that actually controls the display of the panel of the display portion. The panel control portion 10 receives the output of the touch panel portion 12 to identify the touched position (coordinates). The panel control portion 10 compares the touched position with image data on a screen displayed on the display portion 11 when the position is touched, and thereby recognizes the key or the message 8 displayed in the touched position. Data such as a table indicating the correspondence between the output of the touch panel portion 12 and the position (coordinates) is stored in the memory 15. The memory 15 includes a ROM and a RAM. Thus, the panel control portion 10 recognizes the key specified by the user.

The memory 15 stores message data D1 including data on details (such as a string of characters) on the individual messages 8 produced by the user and a administrator. The panel control portion 10 displays, based on the message data D1, the message 8 on the display portion 11 (the details of which will be described later). The memory 15 also stores degree-of-importance data D2 for determining the degree of importance of each message 8. In other words, the storage portion (the memory 15 and the storage device 62) stores the data on the message 8 that is set and produced and the degree-of-importance data D2 for determining the degree of importance of the message 8. The panel control portion 10 determines the degree of importance of each message 8 based on the degree-of-importance data D2 (the details of which will be described later).

In the touch panel portion 12, a position detection portion 121 for detecting the touched position is provided. For example, the position detection portion 121 is an IC for detecting the touched position (the coordinates of the touched point). For example, when the touch panel portion 12 include a capacitance and projection type panel, the position detection portion 121 detects a variation in the capacitance with the touch panel portion 12 to output a signal indicating one or a plurality of simultaneously touched positions. The panel control portion 10 recognizes the touched position based on the output of the position detection portion 121.

A time measurement portion 65 is provided in the multifunctional machine 100. The time measurement portion 65 measures time and functions as a clock. The time measurement portion 65 may be provided within the operation panel 1 or may be provided within the main control portion 6. The operation panel 1 (the multifunctional machine 100) may acquire information indicating a time and date and the time through a network. In this case, the time measurement portion 65 serving as hardware is not needed, and the communication portion 63 or the panel control portion 10 or the main control portion 6 that provides an instruction to acquire the information indicating a time and data and the time functions as the time measurement portion 65.

(Production of the Message 8)

Figure 4:
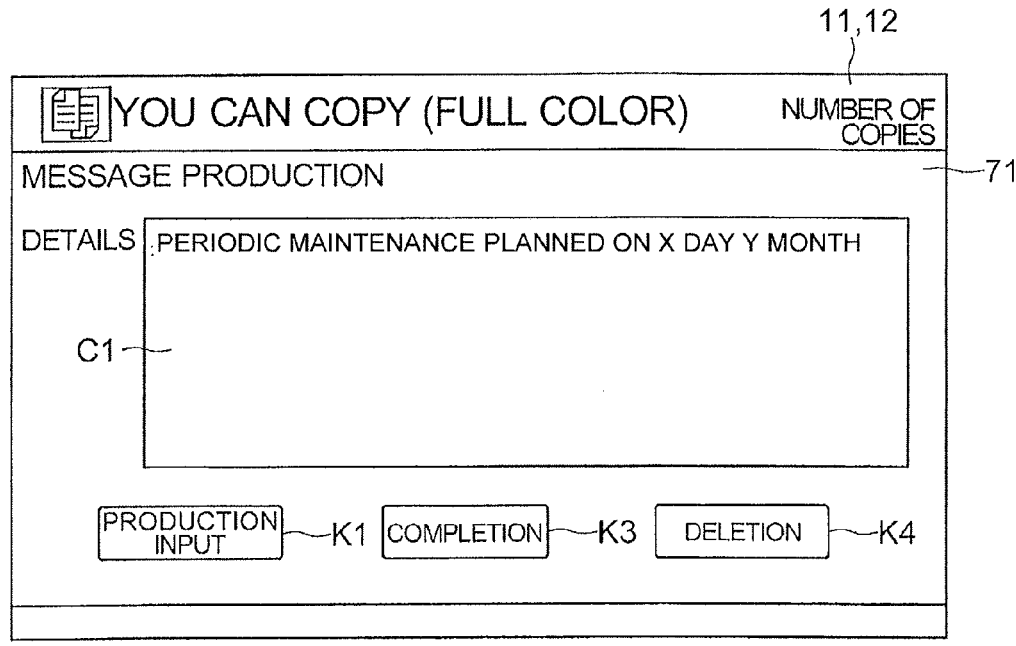
FIG. 4 is a diagram showing a message production screen in the embodiment of the present disclosure.
Figure 5:
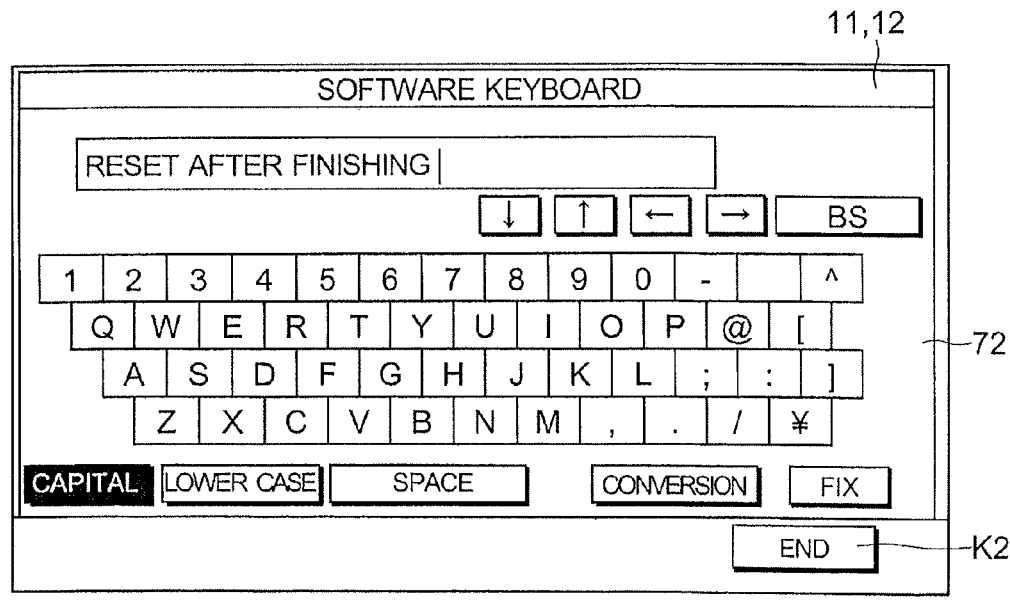
FIG. 5 is a diagram showing a software keyboard screen in the embodiment of the present disclosure.

The production of the message 8 according to the embodiment will now be described with reference to FIGS. 4 and 5. FIG. 4 is a diagram showing a message production screen 71. FIG. 5 is a diagram showing a software keyboard screen 72.

The operation panel 1 of the embodiment displays not only a fixed message (information) such as an error or state information that is previously prepared but also the message 8 such as a precaution that the user or the administrator produces by freely determining its details. The message 8 is an image that is adhered to the screen. In other words, the message 8 is a type of electronic tag, and can also be said to be an image that is displayed on the display portion 11 including text and a string of characters. The message 8 produced by the user will be described below.

The production of the message 8 will first be described with reference to FIG. 4. The user produces an input to the operation panel 1, and thereby can produce and set information (details, text, a string of characters and symbols) which is included in the message 8. Hence, the operation panel 1 functions as a setting portion for setting the details of the message 8 and the like. The details of the message 8 are input with the computer 200, and the multifunctional machine 100 receives the message data D1 produced with the computer 200, with the result that the setting of the message 8 may be performed. In this case, the communication portion 63 functions as the setting portion for setting the details of the message 8 and the like.

In the operation panel 1 of the present embodiment, the message production screen 71 for producing the message 8 is prepared. When a predetermined operation of displaying the message production screen 71 and an input are performed, the panel control portion 10 displays the message production screen 71 on the display portion 11.

On the message production screen 71, a production key K1 for producing and inputting information (such as text and a string of characters) displayed as the message 8 is provided. When the touch of the production key K1 for the display position is detected, the panel control portion 10 displays the software keyboard screen 72 (see FIG. 5) on the display portion 11. The user touches the display position of each key on the software keyboard screen 72, and thereby can produce the message 8 with alphabet, symbols and the like. In other words, the operation portion (such as the touch panel portion 12 and the numeric keypad portion 14) receives an input for producing the message 8.

When the display position of an end key K2 on the software keyboard screen 72 is touched, the panel control portion 10 closes the software keyboard screen 72, and displays the message production screen 71. Then, the panel control portion 10 displays, on the display portion 11, the message 8 produced on the software keyboard screen 72 in a message display field C1.

When the display position of a completion key K3 is touched, the panel control portion 10 stores, in the memory 15, the message data D1 including data indicating the set message 8 and data indicating the details of the message 8. The message data D1 may be stored in the storage device 62. The panel control portion 10 displays the message 8 on the display portion 11 based on the message data D1 stored in the memory 15 or the storage device 62.

(Display Region of the Message 8 and Outline of Display)

Figure 6:
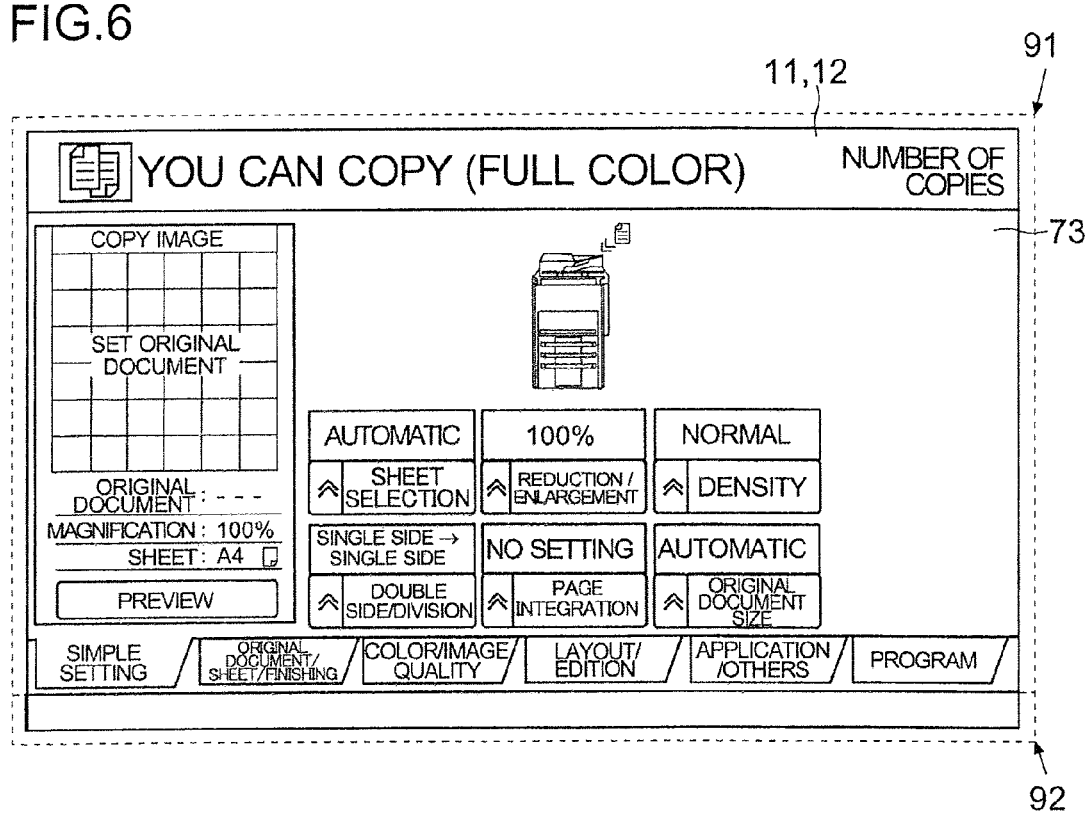
FIG. 6 is a diagram showing an initial setting screen of a copying function in the embodiment of the present disclosure.
Figure 7:
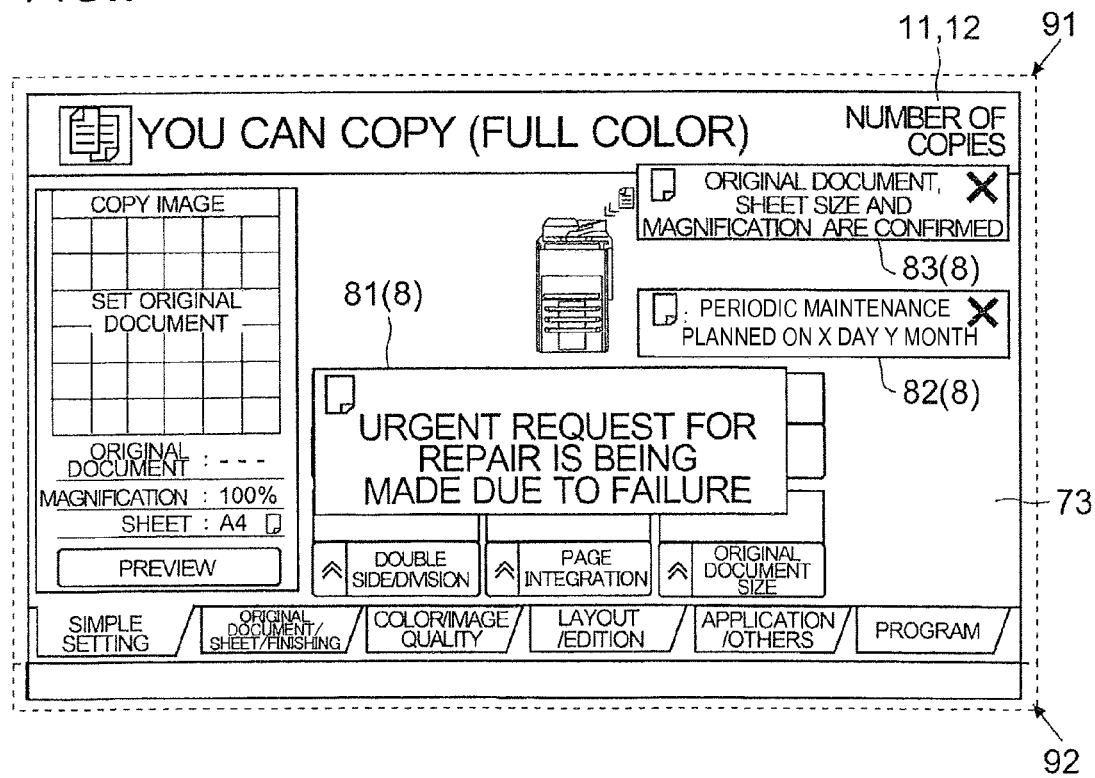
FIG. 7 is a diagram showing the initial setting screen of the copying function on which a message is displayed in the embodiment of the present disclosure.

The display region of the display portion 11 and the outline of the display of the set message 8 will now be described with reference to FIGS. 6 and 7. FIG. 6 is a diagram showing an initial setting screen 73 of the copying function. FIG. 7 is a diagram showing the initial setting screen 73 of the copying function on which the message 8 is displayed.

The multifunctional machine 100 has a plurality of functions such as copying, a printer and transmission; in each of the functions, a plurality of setting items are prepared. Hence, in order to correspond to the input and the operation by the user, a large number of types of screens displayed on the display portion 11 of the operation panel 1 are provided. Hence, for convenience, in the present invention, a description will be given below using, as an example of the screen displayed on the display portion 11 of the operation panel 1, the initial setting screen 73 displayed first when the copying function is selected.

Here, the initial setting screen 73 of the copying function will be described. The initial setting screen 73 of the copying function is an image that is displayed first when the copy key within the function selection key group 14*a* is pressed. As shown in FIG. 6, on the initial setting screen 73 of the copying function, keys for setting the setting items that are often used are provided. The user can set which setting item's key is displayed on the initial setting screen 73.

A plurality of tabs are provided on the initial setting screen 73. Since a large number of setting items on the copying function are present, it is impossible to display all the setting items on one screen. Hence, each setting item on the copying function is allocated to any category (group). On each tab, the category of the setting item on the copying function is shown (such as the original document, the sheet, finishing, colors or image quality). When the display position of a tab other than a simple setting is touched, the operation panel 1 displays, on the display portion 11, an image for selecting the setting item allocated to each category. Then, the user touches the display position of each tab, selects the desired setting item, and thereby can set a setting value of the selected setting item.

The display region of the message 8 will first be described with reference to FIGS. 6 and 7.

As described above, in the operation panel 1 of the present embodiment, the user produces, inputs, sets and registers the message 8 desired to be displayed, and the panel control portion 10 displays the registered message 8 on the display portion 11. Then, in the operation panel 1 of the present embodiment, as a region on which the message 8 is displayed, a main region 91 and a subregion 92 are prepared.

The main region 91 is a region that covers a large part of the display portion 11. In the main region 91, various types of setting screens are also displayed. When the message 8 is displayed in the main region 91, the panel control portion 10 displays the message 8 in the form of an electronic tag on the display portion 11. Hence, as shown in FIG. 7, when the panel control portion 10 displays the message 8 in the main region 91, the panel control portion 10 displays the message 8 on the display portion 11 such that the message 8 is superimposed on the upper side of various types of setting screens (like an electronic tag). In other words, when the message 8 is displayed in the main region 91, the panel control portion 10 displays the message 8 on the display portion 11 such that the message 8 is superimposed as the upper layer on the setting screen.

The subregion 92 is a region that is narrower than the main region 91 (whose size ranges from a fraction of the main region 91 to a fraction of tenths of the main region 91). Hence, the panel control portion 10 displays the message 8 not in the form of an electronic tag but in the form of a line of text. Since the subregion 92 is narrower than the main region 91, the panel control portion 10 displays the message 8 on the display portion 11 such that the display size of the message 8 is smaller than the display size of the main region 91. As described above, the display portion 11 includes, as the display region, the main region 91 and the subregion 92 narrower than the main region 91, and displays the message 8 produced by the user.

Specifically, in the operation panel 1 of the present embodiment, the subregion 92 is provided in the lower end portion of the display portion 11. In the present embodiment, the subregion 92 is a long and thin rectangular region provided in the lower end of the display portion 11 such that the left/right direction of the display portion 11 is its longitudinal direction. The subregion 92 is a region to which part of the display region of the display portion 11 is allocated as the region where the message 8 is displayed. The panel control portion 10 displays the message 8 in the subregion 92 of the display portion 11.

The outline of the display of the message 8 will now be described. The panel control portion 10 confirms the message data D1 on each of the messages 8 stored in the memory 15 or the storage device 62. Then, based on the message data D1, the panel control portion 10 displays, within various types of setting screens, one or a plurality of messages 8 (electronic tags) on the display portion 11 (see FIG. 7). FIG. 7 shows an example where a total of three types of messages 8 (electronic tags), that is, a message 81 saying "an urgent request for repair is being made due to a failure", a message 82 saying "the original document, the sheet size and the magnification are confirmed" and a message 83 saying "periodic maintenance planed on X day Y month", are displayed on the display portion 11.

(Change of the Display Form of the Message 8)

Figure 8:
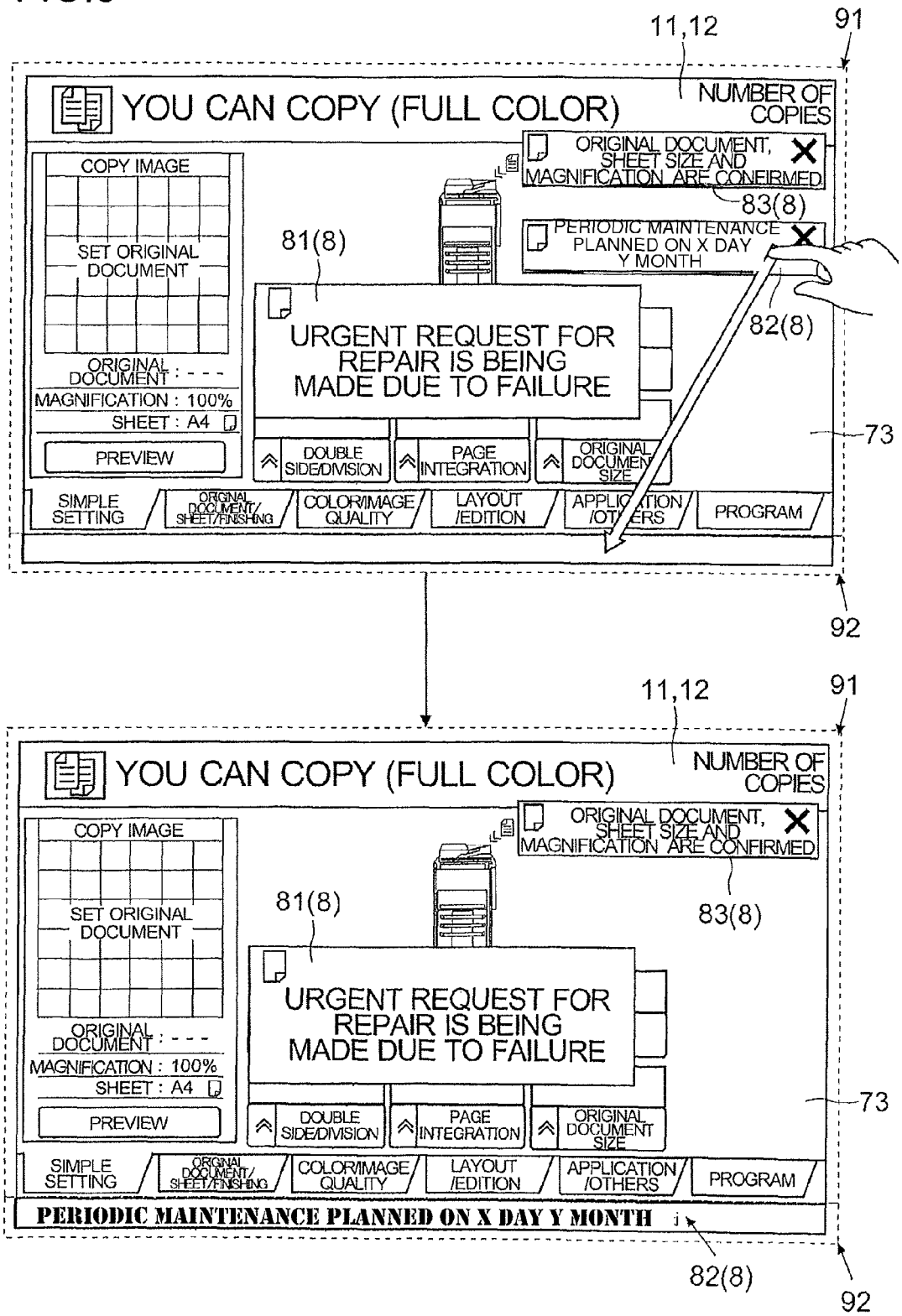
FIG. 8 is a diagram for illustrating the change of the display form of the message in the embodiment of the present disclosure.
Figure 9:
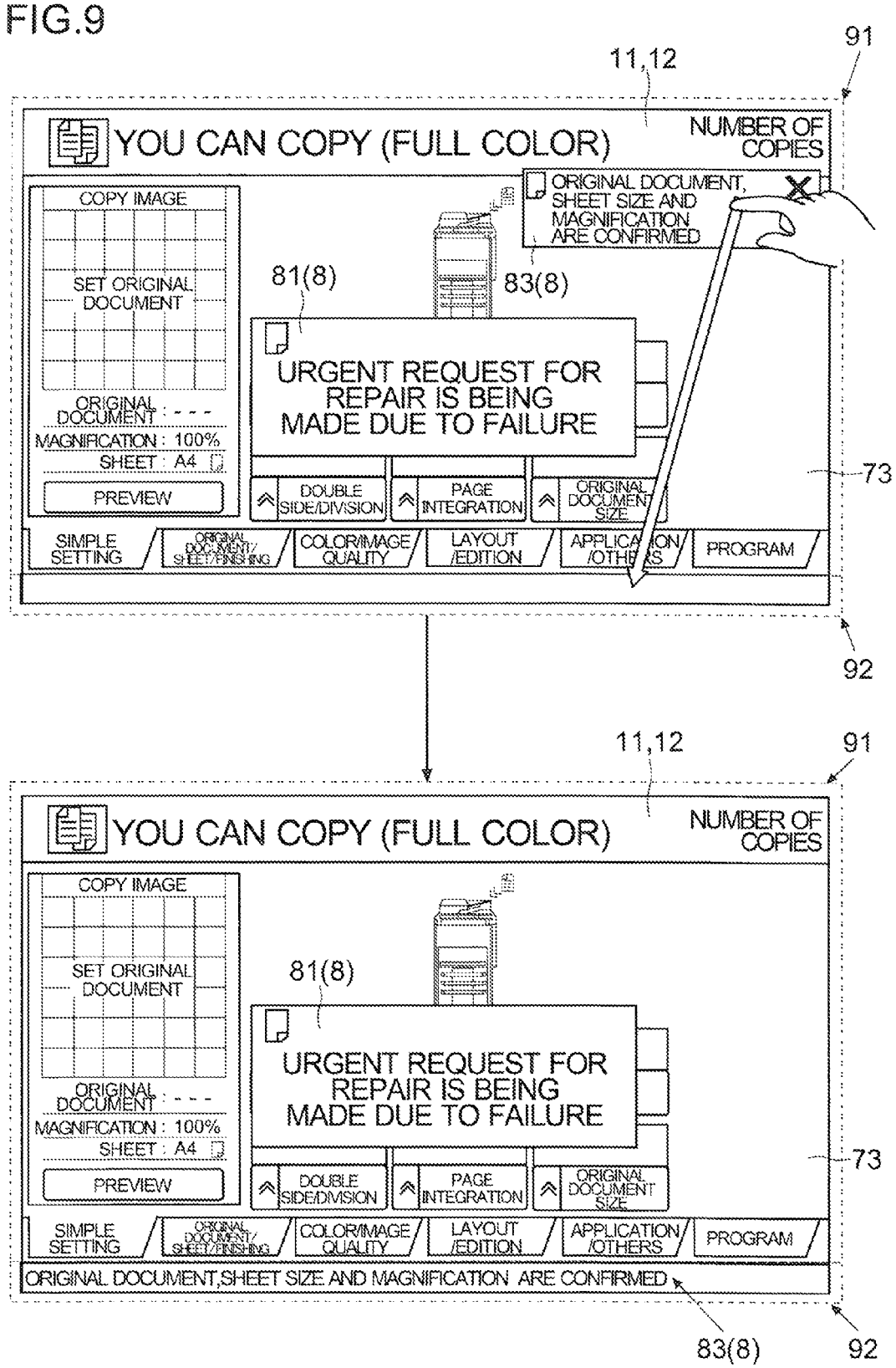
FIG. 9 is a diagram for illustrating the change of the display form of the message in the embodiment of the present disclosure.
Figure 10:
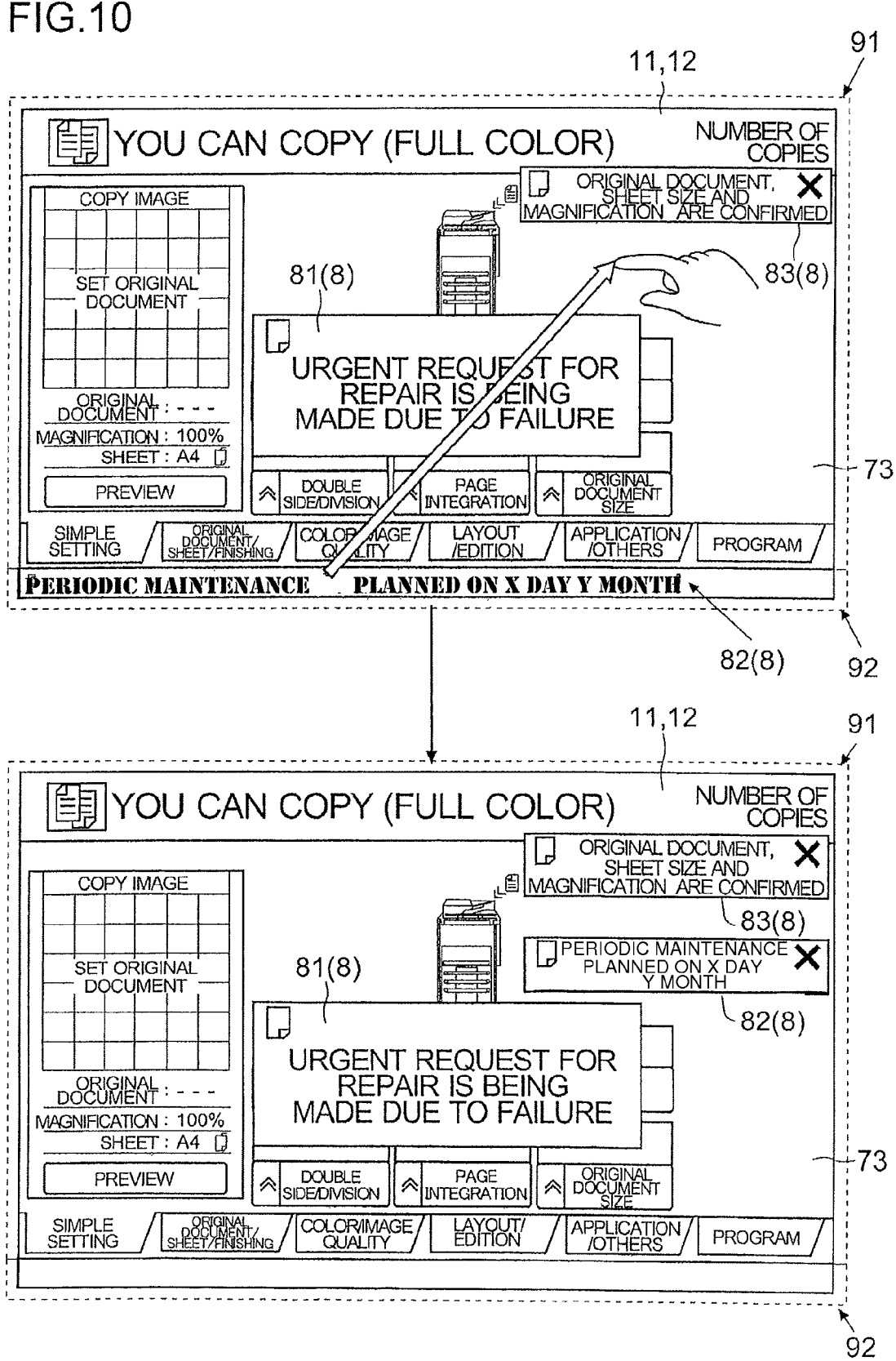
FIG. 10 is a diagram for illustrating the change of the display form of the message in the embodiment of the present disclosure.

The change of the display form of the message 8 will now be described with reference to FIGS. 8 to 10. FIGS. 8 to 10 are diagrams for illustrating the change of the display form of the message 8.

On the operation panel 1 of the present embodiment, the message 8 displayed in the main region 91 as an electronic tag can be displayed in the subregion 92. In other words, the panel control portion 10 changes the display region of the message 8 to change the display form of the message 8 on the display portion 11.

Here, the panel control portion 10 displays the message 8 produced in any one of the subregion 92 and the main region 91. However, when the panel control portion 10 displays the produced, input message 8 for the first time, the panel control portion 10 first displays the message 8 in the main region 91 on the display portion 11. Thus, when the message 8 is displayed on the display portion 11 for the first time, the message 8 is inevitably displayed in the main region 91. Since the message 8 is first displayed in the main region 91, any message 8 can first be displayed in a state where the message 8 is easily and visually recognized by the user.

A case where the message 8 displayed in the main region 91 as the electronic tag is moved to the subregion 92 and is displayed will first be described with reference to FIGS. 8 and 9.

When as shown in FIGS. 8 and 9, based on the output of the touch panel portion 12, the panel control portion 10 receives information that a movement operation for moving the message 8 displayed in the main region 91 to the subregion 92 and displaying it has been performed, the panel control portion 10 displays, in the subregion 92, the message 8 that the movement operation has been performed. In other words, the operation portion (such as the touch panel portion 12 and the numeric keypad portion 14) receives the movement operation for moving, performed by the user, the message 8 displayed in the main region 91 to the subregion 92 and displaying it. Then, the panel control portion 10 subsequently does not display, in the main region 91, the message 8 on which the movement operation has been performed. As shown in FIG. 8, it is possible to highlight the message 8 whose display region has been moved; as shown in FIG. 9, it is also possible to normally display the message 8 whose display region has been moved without highlighting it.

Depending on the degree of importance of the message 8, it may be impossible to change the display region of the message 8 from the main region 91 to the subregion 92 (the details of which will be described later).

What type of operation is made to correspond to the movement operation is not particularly limited. For example, as indicated by a white arrow in FIGS. 8 and 9, on the operation panel 1 of the present embodiment, a drag and drop operation is received as the movement operation. Specifically, the message 8 (the message 8 being displayed in the main region 91; in other words, the electronic tag in the main region 91) whose display region is changed is touched, and with the touch panel portion 12 touched, the touched position is moved to the subregion 92, and thereafter an operation of separating the finger from the touch panel portion 12 is received as the movement operation.

When there are a plurality of messages 8 that need to be displayed in the subregion 92, the panel control portion 10 sequentially switches the messages 8 to be displayed at regular intervals (for example, at the intervals of a few seconds).

A case where the message 8 (an arbitrary message 8 produced by the user on the message production screen 71) displayed in the subregion 92 is displayed in the main region 91 will now be described with reference to FIG. 10.

As shown in FIG. 10, based on the output of the touch panel portion 12, the panel control portion 10 receives information that a return operation of moving the message 8 displayed in the subregion 92 to the main region 91 and displaying it has been performed. In other words, the operation portion (such as the touch panel portion 12 and the numeric keypad portion 14) receives the return operation of returning the message 8 displayed in the subregion 92 to the main region 91. Then, the panel control portion 10 stops the display of the message 8, in the subregion 92, on which the return operation has been performed, and displays the message 8 in the form of an electronic tag in the main region 91. Then, the panel control portion 10 subsequently does not display, in the subregion 92, the message 8 on which the return operation has been performed. Thus, it is possible to switch the region (position) where the message 8 is displayed, according to the intension of the user. Hence, it is possible to display the desired message 8 in the formed desired by the user.

What type of operation is made to correspond to the return operation is not particularly limited. For example, as indicated by a white arrow in FIG. 10, as in the movement operation (see the white arrow in FIG. 9), a drag and drop operation is received as the return operation. Specifically, the message 8 (the message 8 being displayed in the subregion 92, subregion 92) whose display region is changed is touched, and with the touch panel portion 12 touched, the touched position is moved to the main region 91, and thereafter an operation of separating the finger from the touch panel portion 12 is received as the return operation.

Then, the memory 15 stores, in a nonvolatile manner, in which one of the main region 91 and the subregion 92 each message 8 is stored (the memory 15 may store it in a volatile manner). The memory 15 stores the message 8 whose display region has been moved by the movement operation from the main region 91 to the subregion 92 such that the message 8 is thereafter displayed in the subregion 92. On the other hand, the memory 15 stores the message 8 whose display region has been moved by the return operation from the subregion 92 to the main region 91 such that the message 8 is thereafter displayed in the main region 91. Since the message 8 is first displayed in the main region 91, the memory 15 stores information that message 8 is displayed in the main region 91 by default.

(Edition of the Message 8)

The operation panel 1 may receive an operation of and a setting for editing the details of the displayed message 8. Hence, the edition of the message 8 produced by the user will be described with reference to FIG. 4.

When a specific operation for editing the displayed message 8 is performed, the panel control portion 10 displays, on the display portion 11, the message production screen 71 corresponding to the message 8 that is the edition target. For example, this specific operation is a type of operation of touching (touching, in a manner similar to double clicking) the display position (within the region of an electronic tag) of the message 8 within a predetermined period of time a plurality of times. Here, the message production screen 71 is displayed in a state where the message 8 that is the edition target is displayed in the message display field C1.

The user can correct the message 8 that is the edition target. When the display position of the production key K1 on the message production screen 71 for the message 8 to be edited is touched, the panel control portion 10 displays the software keyboard screen 72 on the display portion 11. Then, the panel control portion 10 updates the message data D1 by reflecting the details after the correction. Thus, the panel control portion 10 subsequently displays, on the display portion 11, the message 8 the details of which correspond to the message 8 on which the correction has been performed.

The user can delete the message 8 which is the edition target such that the message 8 is not displayed afterward. When the display position of a deletion key K4 on the message production screen 71 is touched so that the message 8 is deleted, the panel control portion 10 makes the memory 15 or the storage device 62 remove (delete) the message data D1 corresponding to the message 8 indicated to be deleted. Thus, it is also possible to prevent the desired message 8 (electronic tag) from being displayed afterward. The panel control portion 10 subsequently does not display the deleted message 8 on the display portion 11.

Alternatively, on the message production screen 71, it is possible to set a period of time during which the produced message 8 (electronic tag) is displayed. The user uses the numeric keypad portion 14 or the like to set the display period on the message production screen 71. Then, the panel control portion 10 displays, on the display portion 11, the message 8 (electronic tag) within the display period, and deletes the message data D1 on the message 8 (electronic tag) exceeding the display period from the memory 15 or the storage device 62.

(Display Control on the Message 8 Based on the Degree of Importance)

Figure 11:
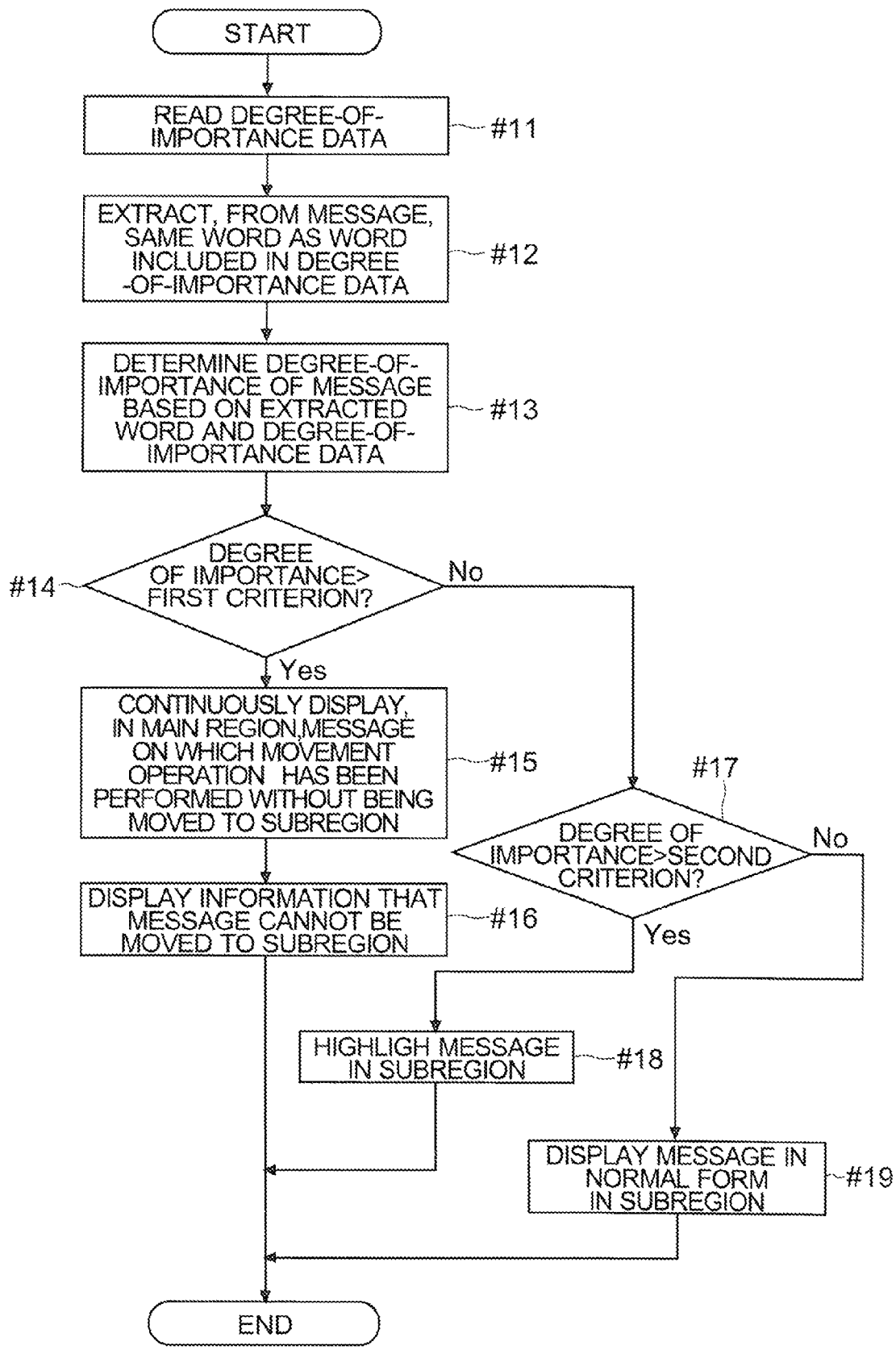
FIG. 11 is a flowchart showing the flow of change control on the display form (display position) of the message in the embodiment of the present disclosure.
Figures 12, 13:
FIG. 12 is a diagram showing degree-of-importance data in the embodiment of the present disclosure.
FIG. 13 is a diagram showing a degree-of-importance data setting screen by a user in the embodiment of the present disclosure.

A flow of display control on the message 8 on the operation panel 1 according to the present embodiment will now be described with reference to FIGS. 11 and 12. FIG. 11 is a flowchart showing the flow of change control on the display form (display position) of the message 8. FIG. 12 is a diagram showing the degree-of-importance data D2.

On the operation panel 1 of the multifunctional machine 100 according to the present embodiment, the user can display the desired message 8. Then, the user operates the operation panel 1, and thereby can display, in the subregion 92, the message 8 displayed as an electronic tag in the main region 91. In other words, the display position of the message 8 is changed, and thus it is possible to change the display form of the message 8.

Here, the subregion 92 is narrower than the main region 91. Although in the main region 91, the message 8 is continuously displayed as the electronic tag, when a plurality of messages 8 to be displayed are present in the subregion 92, the messages 8 are switched periodically (at regular intervals).

However, some of the messages 8 are important. Some of the messages 8 need to be constantly displayed in the main region 91. Even when the movement operation is performed on such a message 8, the message 8 is not displayed in the subregion 92 but needs to be continuously displayed in the main region 91. Even when the message 8 is displayed in the subregion 92, the message 8 having a relatively high degree of importance needs to be displayed in a form which draws the attention of the user.

However, it is difficult to determine the degree of importance. Some users feel that the setting of the degree of importance for each message 8 is bothersome. Hence, in the operation panel 1 of the present embodiment, the degree of importance of the message 8 is automatically determined from the details of the message 8, and the message 8 is displayed in the form corresponding to the determined degree of importance.

Hence, the flow of the control (display control) on the display form of the message 8 based on the degree of importance will be described with reference to FIGS. 11 and 12.

At the start of FIG. 11, the panel control portion 10 displays, based on the message data D1, as the electronic tag of the main region 91, one or a plurality of messages 8 on the display portion 11. It is a time when the movement operation is performed on any one of the messages 8 that are being displayed on the display portion 11.

Then, the panel control portion 10 reads the degree-of-importance data D2 for determining the degree of importance of the message 8 (the message 8 on which the operation of changing the display position from the main region 91 to the subregion 92 has been performed) on which the movement operation has been performed (step #11). The degree-of-importance data D2 is stored in the memory 15 or the storage device 62. Then, the panel control portion 10 determines, based on the degree-of-importance data D2, the degree of importance of the message 8 on which the movement operation has been performed. Although an example where the degree of importance is decided by the panel control portion 10 is described below, a portion, such as the main control portion 6, that performs another computation may decide (determine) the degree of importance of the message 8.

Here, an example of the degree-of-importance data D2 and a method of determining the degree of importance of the message 8 will be described with reference to FIG. 12.

As shown in FIG. 12, the degree-of-importance data D2 is data in the form of a table, and a plurality of words are defined (stored). In the degree-of-importance data D2, for each word, a degree-of-importance value that is a value indicating the degree of importance of the word is determined. In other words, the degree-of-importance data D2 is data that includes a plurality of types of combinations of the words and the degree-of-importance values that are values indicating the degree of importance of the words.

In the degree-of-importance data D2 shown in FIG. 12, the degree-of-importance value is a value of any one of 10 levels (any of the values from 1 to 10). The degree-of-importance value may have 9 levels or less or may have 11 levels or more. It is arbitrarily possible to determine which word is included in the degree-of-importance data D2 and what degree-of-importance value is allocated to the word. FIG. 12 shows part of the words actually included in the degree-of-importance data D2. In the degree-of-importance data D2 shown in FIG. 12 and according to the present embodiment, a higher degree-of-importance value is provided to the word regarded as having a higher degree of importance.

An example of the method of determining the degree of importance of the message 8 will be described. The panel control portion 10 of the present embodiment first compares each word in the degree-of-importance data D2 with the details (text, a string of characters) of the message 8, and extracts, from the message 8, the same word (the corresponding word) as the word included in the degree-of-importance data D2 (step #12). For example, for the message 8 saying "an urgent request for repair is being made due to a failure" shown in FIG. 7 and the like, the panel control portion 10 extracts, as the words corresponding to the words in the degree-of-importance data D2, the words "failure", "urgent" and "repair".

Then, the determination portion (the panel control portion 10) determines the degree of importance of the message 8 based on the extracted words (the words included in the message 8) and the degree-of-importance data D2 (degree-of-importance value) (step #13). In the present embodiment, the panel control portion 10 determines the total of the degree-of-importance values defined in the degree-of-importance data D2 on the extracted corresponding words. The panel control portion 10 determines that the average value of the determined totals is the degree of importance (indicating value) of the message 8. The panel control portion 10 may determine that the total value of the degree-of-importance values of the extracted words is, in itself, the degree of importance of the message 8. The panel control portion 10 may determine that, among the extracted words, the highest degree-of-importance value or the lowest degree-of-importance value is the degree of importance of the message 8. It is possible to determine the degree of importance of the message 8 based on the degree-of-importance data D2 and predetermined criteria. Hence, as the degree of importance of the message 8, an appropriate value is automatically determined. It is possible to determine, as necessary, how the degree-of-importance values of the words included in the message 8 are processed and a value indicating the degree of importance of the message 8 is decided (the degree of importance of the message 8 is determined).

Then, the panel control portion 10 determines whether or not the determined degree of importance of the message 8 is higher than a predetermined first criterion (step #14). The first criterion is a value for determining the degree of the importance of the message 8, and is also a threshold value for determining whether the message 8 is continuously displayed in the main region 91 or the display position may be moved to the subregion 92.

When the degree of importance of the message 8 is higher than the first criterion (yes in step #14), the message 8 can be regarded as significantly important. Then, the message 8 needs to be continuously displayed not in the subregion 92 but in the main region 91. Hence, when the degree of importance of the message 8 is higher than the first criterion (yes in step #14), the panel control portion 10 does not move, to the subregion 92, the message 8 on which the movement operation has been performed, and continuously displays it in the main region 91 on the display portion 11 (step #15). When the degree of importance is equal to or lower than the first criterion, the display portion 11 displays, in the subregion 92, the message 8 on which the movement operation has been performed (details of which will be described later). Then, the panel control portion 10 displays, on the display portion 11, information that the message 8 cannot be moved to the subregion 92 (step #16→end). Thus, among arbitrary messages 8 input by the user, the message 8 having a high degree of importance is continuously displayed in the main region 91 even when the movement operation is performed. Hence, it is possible to continuously display the message 8 having a high degree of importance in a state where the message 8 is easily recognized by the user. Thus, it is possible to prevent an important message 8 from being overlooked. Among arbitrary messages 8 input by the user, the message 8 having a relatively low degree of importance is displayed in the subregion 92, and thus it is possible to reduce the proportion of the message 8 in the main region 91 of the display portion 11, with the result that it is possible to effectively utilize the display region. Furthermore, it is not necessary for an inputting person to preset the degree of importance of the message 8, and the degree of importance of each message 8 is automatically determined. It is therefore possible to accurately change the display form of the message 8 according to the degree of importance, with the result that the display device (the operation panel 1) is easily seen and used.

On the other hand, when the degree of importance of the message 8 is equal to or lower than the first criterion (no in step #14), the message 8 is not so important that the message 8 is continuously displayed in the main region 91. Hence, when the degree of importance is equal to or lower than the first criterion (no in step #14), in order to determine the display form of the message 8 in the subregion 92, the panel control portion 10 confirms whether or not the degree of importance of the message 8 is higher than a predetermined second criterion (step #17).

The second criterion is a value for determining whether or not the message 8 is highlighted in the subregion 92. In the terms of importance, the second criterion is lower than the first criterion.

When the degree of importance of the message 8 to be displayed in the subregion 92 is higher than the second criterion (yes in step #17), among the messages 8 displayed in the subregion 92, such a message 8 is relatively important, and thus the message 8 probably needs to be highlighted to draw the attention of the user.

Hence, when the degree of importance of the message 8 is higher than the second criterion (yes in step #17), the panel control portion 10 displays, in the subregion 92 on the display portion 11, the message 8 on which the movement operation has been performed, while highlighting it (step #18→end). Thus, since among the messages 8 displayed in the subregion 92, the message 8 having a high degree of importance is highlighted, the message 8 is easily recognized by the user and is prevented from being overlooked. Hence, as the degree of importance is increased, it is possible to display the message 8 in a state where the message 8 is easily recognized by the user, with the result that it is possible to accurately change the display form of the message 8 according to the degree of importance.

The display form of the highlighting is different from the display form (simple text display without decoration) of the normal message 8. The types of highlighting include white characters, the display of bold characters, display with a color different from the normal, blinking display, scrolling display, a phrase that means highlighting and display to which a symbol (for example, "caution" or "!") is added; the highlighting is not particularly limited.

On the other hand, when the degree of importance of the message 8 to be displayed in the subregion 92 is equal to or lower than the second criterion (no in step #17), among the messages 8 displayed in the subregion 92, the degree of importance of such a message 8 is said to be relatively low. Hence, the panel control portion 10 displays, in the normal form, in the subregion 92 on the display portion 11, the message 8 whose degree of importance is equal to or lower than the second criterion without being highlighted (step #19→end).

An example of the display of the message 8 when the degree of importance of the message 8 is determined by the average value of the degree-of-importance values of words will be described below with reference to FIGS. 8 and 9. A description will be given using, as the messages 8, three examples illustrated in FIG. 7 and the like, that is, the message 81 saying "an urgent request for repair is being made due to a failure" (hereinafter referred to as a "first message 81"), the message 82 saying "periodic maintenance planed on X day Y month" (hereinafter referred to as a "second message 82") and the message 83 saying "the original document, the sheet size and the magnification are confirmed" (hereinafter referred to as a "third message 83"). A description will be given on the assumption that, as the degree-of-importance data D2, the degree-of-importance data D2 in FIG. 12 is used, the first criterion is "20/3" and the second criterion is "10/3."

When the degree of importance of the message 8 is determined with the degree-of-importance data D2 in FIG. 12, the average value (the degree of importance of the first message 81) of the degree-of-importance values of the words "urgent", "repair" and "failure" included in the first message 81 is "9" (=(10+8+9)/3). The average value (the degree of importance of the second message 82) of the degree-of-importance values of the words "periodic" and "maintenance" included in the second message 82 is "5" (=(4+6)/2). The average value (the degree of importance of the third message 83) of the degree-of-importance values of the words "original document" and "sheet" included in the third message 83 is "2.5" (=(2+3)/2).

Consequently, when the movement operation is performed on the first to third messages 81 to 83 displayed in the main region 91 as the electronic tags, as compared with the first criterion, the first message 81 is continuously displayed in the main region 91, the second message 82 is highlighted in the subregion 92 (see FIG. 7) and the third message 83 is normally displayed in the subregion 92.

(Setting of the Degree-of-Importance Data D2 by the User)

The setting of the degree-of-importance data D2 by the user will now be described with reference to FIG. 13. FIG. 13 is a diagram showing a degree-of-importance data setting screen 74 by the user.

When the movement operation is performed on the message 8 displayed in the main region 91, based on the degree-of-importance data D2, the panel control portion 10 automatically determines the degree of importance of the message 8. Then, based on the determined degree of importance, whether or not the display position of the message 8 is moved to the subregion 92 is determined.

However, it is likely that, for a certain user, the degree of importance of words determined by default is appropriate but it is not appropriate for another use. When words and the degree of importance thereof determined in the degree-of-importance data D2 are not appropriate, for the user thereof, it is likely that a message 8 which is not significantly important is prevented being moved to the display position (display region) of the subregion 92, and is continuously displayed in the main region 91.

Hence, in the operation panel 1 of the present embodiment, the user can set the degree-of-importance data D2. When an operation of opening the degree-of-importance data setting screen 74 is performed, the panel control portion 10 displays the degree-of-importance data setting screen 74 on the display portion 11. The operation portion (such as the touch panel portion 12 and the numeric keypad portion 14) of the operation panel 1 receives an input produced by the user on the degree-of-importance data setting screen 74 as the input for performing a setting on the degree-of-importance data D2.

On the degree-of-importance data setting screen 74, a list display region C2 is provided in which the details of the degree-of-importance data D2 are displayed as a list. The user touches, in the list display region C2, the display position of the degree-of-importance value desired to be changed, and thereby can set the degree-of-importance value to the desired value with the numeric keypad portion 14 or the like. When the display position of a completion key K5 is touched, the panel control portion 10 makes the memory 15 or the storage device 62 update the degree-of-importance data D2 such that the degree-of-importance value is the degree-of-importance value which has been changed.

On the degree-of-importance data setting screen 74, a new word key K6 is provided. When the display position of the new word key K6 is touched, the panel control portion 10 displays, on the display portion 11, a software keyboard screen 72 shown in FIG. 5. When the user inputs a word and touches the display position of the completion key K5, the panel control portion 10 makes the memory 15 or the storage device 62 update the degree-of-importance data D2 and add the new word to the degree-of-importance data D2. Thereafter, by the operation described above, the user inputs the degree-of-importance value. Thus, the panel control portion 10 makes the memory 15 or the storage device 62 update the degree-of-importance data D2 such that the degree-of-importance value of the newly added word is the input degree-of-importance value. As described above, the storage portion (the memory 15 and the storage device 62) updates the degree-of-importance data D2 according to the setting made on the operation portion (such as the touch panel portion 12 and the numeric keypad portion 14). In this way, the user can newly include a word in the degree-of-importance data D2 and change the degree-of-importance value of each word included in the degree-of-importance data D2. Thus, it is possible to change the display form of the message 8 based on the intension of the user.

On the degree-of-importance data setting screen 74, a deletion key K7 is provided. When the display position of any word key is touched to specify the word, and then the display device of the deletion key K7 is touched, the panel control portion 10 makes the memory 15 or the storage device 62 delete the specified word and the degree-of-importance value of the specified value from the degree-of-importance data D2 to update the degree-of-importance data D2.

(Automatic Updating of the Degree-of-Importance Data D2)

Figures 14, 15:
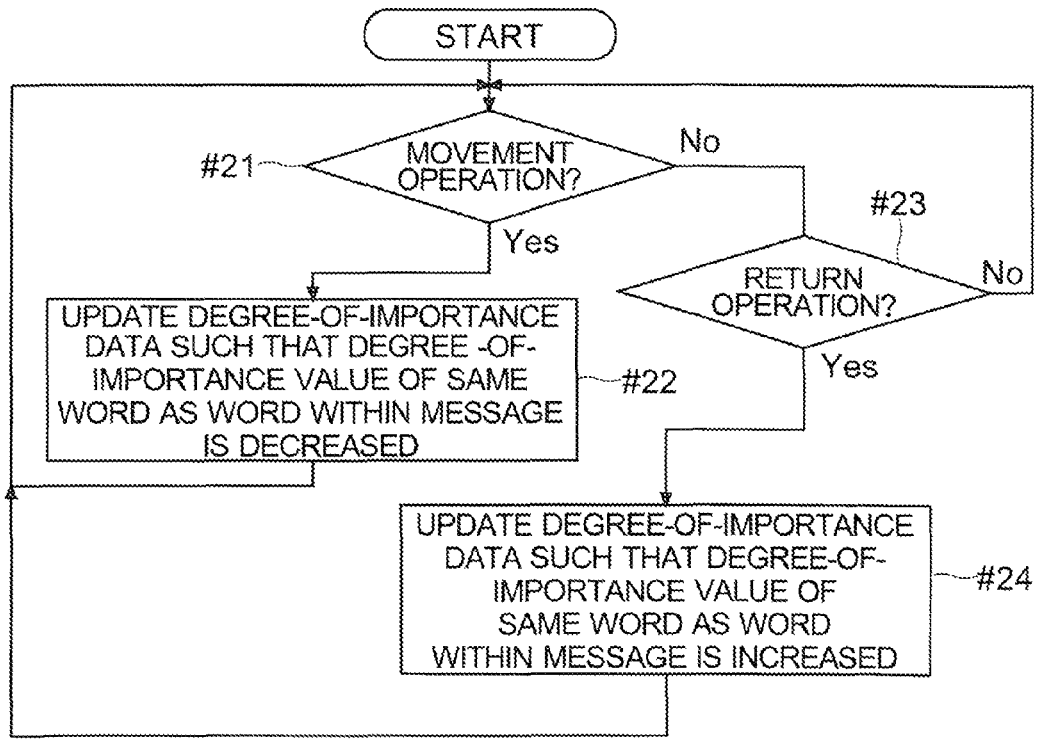
FIG. 14 is a flowchart showing the flow of automatic updating in the embodiment of the present disclosure.
FIG. 15 is a diagram showing the updating of the degree-of-importance data in the embodiment of the present disclosure.

The automatic updating of the degree-of-importance data D2 will now be described with reference to FIGS. 14 and 15. FIG. 14 is a flowchart showing the flow of the automatic updating. FIG. 15 is a diagram showing the updating of the degree-of-importance data D2.

When the movement operation is performed on the message 8 displayed in the main region 91, based on the degree-of-importance data D2, the panel control portion 10 automatically determines the degree of importance of the message 8, and whether or not the display position of the message 8 can be moved to the subregion 92 is determined. However, the degree-of-importance data D2 is not necessarily optimum for the user.

Hence, the operation panel 1 of the present embodiment updates the degree-of-importance data D2 according to the movement operation or the return operation of the message 8 to optimize the degree-of-importance data D2 by learning. Thus, it is possible to realize the change of the display form of the message 8 corresponding to the intension of the user.

An example of the flow of the automatic updating of the degree-of-importance data D2 will be described with reference to FIG. 14. At the start of FIG. 14, power is supplied to the multifunctional machine 100 or the operation panel 1, and the display portion 11 produces a display without entering a low-power mode or the like.

The panel control portion 10 first confirms, based on the output of the touch panel portion 12, whether or not the movement operation on the message 8 is performed (step #21). When the movement operation is performed (yes in step #21), the panel control portion 10 makes the memory 15 or the storage device 62 update the degree-of-importance data D2 such that, among the words included in the degree-of-importance data D2, the degree-of-importance values of the same words as words included in the message 8 on which the movement operation has been performed are decreased (step #22). Thus, the degree-of-importance values of the words included in the message 8 which is determined by the user not to be significantly important, is determined to be moved to the subregion 92 and is determined to be displayed in a smaller size are decreased. Hence, messages 8 equal and similar to the message 8 on which the movement operation has been performed are more likely to be moved to the subregion 92 afterward. As described above, the result of the operation by the user is stored and learned, and thus it is possible to easily change the display form of the message 8 according to the intension of the user. The flow after step #22 returns to step #21.

On the other hand, when the movement operation is not performed (no in step #21), the panel control portion 10 confirms, based on the output of the touch panel portion 12, whether or not the return operation on the message 8 has been performed (step #23). When the return operation is performed (yes in step #23), the panel control portion 10 makes the memory 15 or the storage device 62 update the degree-of-importance data D2 such that, among the words included in the degree-of-importance data D2, the degree-of-importance values of the same words as words included in the message 8 on which the return operation has been performed are increased (step #24). Thus, the degree-of-importance values of the words included in the message 8 which is determined by the user to be important and is determined to be displayed in the main region 91 in a larger size are increased. Hence, messages 8 equal and similar to the message 8 on which the return operation has been performed is unlikely to be moved to the subregion 92 afterward. As described above, the result of the operation by the user is stored and learned, and thus it is also possible to prevent the display form of the message 8 having a high degree of importance from being changed such that the message 8 is noticed by the user.

In the example of FIG. 15, when the movement operation is performed on the message 8 saying "an urgent request for repair is being made due to a failure", as shown in FIG. 15, the panel control portion 10 decreases the degree-of-importance value of the words "failure", "urgent" and "repair" in the degree-of-importance data D2 by one. For example, when the return operation is performed on the message 8 saying "periodic maintenance planed on X day Y month", as shown in FIG. 15, the panel control portion 10 increases the degree-of-importance value of the words "periodic" and "maintenance" in the degree-of-importance data D2 by one.

The image forming apparatus (the multifunctional machine 100) includes the display device (the operation panel 1) described above. Thus, the degree of importance of the message 8 is automatically determined, and it is not necessary for an inputting person of the message 8 to set the degree of importance of the message 8, with the result that it is possible to provide the easy-to-use image forming apparatus. Since the display device that can accurately change the display form of the message 8 according to the degree of importance is included, it is possible to provide the image forming apparatus that is easy to see without an important message 8 being overlooked.

The present disclosure can be regarded as a method.

Although the embodiment of the present disclosure has been described, the scope of the present disclosure is not limited to the embodiment; various modifications are possible without departing from the spirit of the disclosure.

What is claimed is:

1. A display device comprising:
a display portion that includes, within one screen, as a display region, a main region and a subregion narrower than the main region and that displays a message produced by a user;
an operation portion that receives a movement operation that is an operation, performed by the user, for moving the message displayed in the main region to the subregion and displaying the message and that is an operation of touching the message for changing the display region, moving a touch position to the subregion while touching the message and thereafter separating a finger;
a storage portion that stores set data on the message and degree-of-importance data which is data for determining a degree of importance of the message and which includes a plurality of combinations of words and degree-of-importance values that are values indicating the degrees of importance of the words; and
a determination portion that determines, based on a word included in the message and the degree-of-importance value corresponding to the word included in the degree-of-importance data, the degree of importance of the message on which the movement operation has been performed, the display portion displaying, in the subregion, the message on which the movement operation has been performed when the degree of importance of the message on which the movement operation has been performed is equal to or lower than a predetermined first criterion and continuously displaying, in the main region, without the message on which the movement operation has been performed being moved to the subregion, the message when the degree of importance of the message on which the movement operation has been performed is higher than the first criterion and further highlighting the message and displaying the message in the subregion when the degree of importance of the message displayed in the subregion is higher than a predetermined second criterion whereas, without highlighting the message, displaying the message in the subregion when the degree of importance of the message displayed in the subregion is equal to or lower than the second criterion.

2. The display device of claim 1,
wherein the operation portion receives a return operation for returning, to the main region, the message displayed in the subregion, and
the display device stops displaying, in the subregion, the message on which the return operation has been performed, and displays, in the main region, the message on which the return operation has been performed.

3. The display device of claim 1,
wherein the degree-of-importance data includes a plurality of combinations of words and degree-of-importance values that are values indicating the degrees of importance of the words,
the storage portion updates the degree-of-importance data such that, among the words included in the degree-of-importance data, the degree-of-importance value of the same word as the word included in the message on which the movement operation has been performed is decreased.

4. The display device of claim 2,
wherein the storage portion updates the degree-of-importance data such that, among the words included in the degree-of-importance data, the degree-of-importance value of the same word as the word included in the message on which the return operation has been performed is increased.

5. The display device of claim 1,
wherein the determination portion determines a total of the degree-of-importance values, defined on the degree-of-importance data, of words extracted from the message, and determines that an average value of the determined total or the total value itself is the degree of importance of the message or determines that the highest or lowest degree-of-importance value of the degree-of-importance values corresponding to the words extracted from the message is the degree of importance of the message.

6. The display device of claim 1,
wherein the operation portion receives an input for setting the degree-of-importance data by the user, and
the storage portion updates the degree-of-importance data according to the setting made by the storage portion.

7. The display device of claim 1,
wherein the display portion displays the message in the main region when the display device displays the message for the first time.

8. The display device of claim 1,
wherein, when the message on which the movement operation has been performed is continuously displayed in the main region without being moved to the subregion, the display portion displays information that the message on which the movement operation has been performed cannot be moved.

9. An image forming apparatus comprising:
the display device of claim 1.

10. A method of controlling a display device, comprising the following steps:
displaying a message produced by a user in a display region, within one screen, including a main region and a subregion narrower than the main region;
receiving a movement operation that is an operation, performed by the user, for moving the message displayed in the main region to the subregion and displaying the message and that is an operation of touching the message for changing the display region, moving a touch position to the subregion while touching the message and thereafter separating a finger;
storing set data on the message and degree-of-importance data which is data for determining a degree of importance of the message and which includes a plurality of combinations of words and degree-of-importance values that are values indicating the degrees of importance of the words;
determining, based on the degree-of-importance data, the degree of importance of the message on which the movement operation has been performed;
displaying, in the subregion, the message on which the movement operation has been performed when the degree of importance of the message on which the movement operation has been performed is equal to or lower than a predetermined first criterion; and
continuously displaying, in the main region, without the message on which the movement operation has been performed being moved to the subregion, the message when the degree of importance of the message on which the movement operation has been performed is higher than the first criterion
wherein the message is highlighted and displayed in the subregion when the degree of importance of the message displayed in the subregion is higher than a predetermined second criterion whereas the message is not highlighted but displayed in the subregion when the degree of importance of the message displayed in the subregion is equal to or lower than the second criterion.

11. The method of controlling a display device according to claim 10,
wherein a return operation for returning, to the main region, the message displayed in the subregion is received, and
displaying, in the subregion, the message on which the return operation has been performed is stopped, and the message on which the return operation has been performed is displayed in the main region.

12. The method of controlling a display device according to claim 10,
wherein the degree-of-importance data includes a plurality of combinations of words and degree-of-importance values that are values indicating the degrees of importance of the words, and
the degree-of-importance data is updated such that, among the words included in the degree-of-importance data, the degree-of-importance value of the same word as the word included in the message on which the movement operation has been performed is decreased.

13. The method of controlling a display device according to claim 11,
wherein the degree-of-importance data is updated such that, among the words included in the degree-of-importance data, the degree-of-importance value of the same word as the word included in the message on which the return operation has been performed is increased.

14. The method of controlling a display device according to claim 10,
wherein a total of the degree-of-importance values, defined on the degree-of-importance data, of words extracted from the message is determined, and it is determined that an average value of the determined total or the total value itself is the degree of importance of the message or it is determined that the highest or lowest degree-of-importance value of the degree-of-importance values corresponding to the words extracted from the message is the degree of importance of the message.

15. The method of controlling a display device according to claim 10,
wherein an input for setting the degree-of-importance data by the user is received, and the degree-of-importance data is updated according to the setting made.

16. The method of controlling a display device according to claim 10,
wherein the message is displayed in the main region when the display device displays the message for the first time.

17. The method of controlling a display device according to claim 10,
wherein, when the message on which the movement operation has been performed is continuously displayed in the main region without being moved to the subregion, information that the message on which the movement operation has been performed cannot be moved is displayed.

* * * * *